(12) United States Patent
Moore et al.

(10) Patent No.: US 11,148,357 B2
(45) Date of Patent: Oct. 19, 2021

(54) METHOD OF MAKING COMPOSITE OBJECTS BY ADDITIVE MANUFACTURING

(71) Applicant: Carbon, Inc., Redwood City, CA (US)

(72) Inventors: David Moore, San Carlos, CA (US); Matthew Jeffery Garrity, Redwood City, CA (US); William Joseph Stark, Hillsborough, CA (US); Sean Friedrich Walter McCluskey, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 284 days.

(21) Appl. No.: 16/479,075

(22) PCT Filed: Feb. 12, 2018

(86) PCT No.: PCT/US2018/017772
§ 371 (c)(1),
(2) Date: Jul. 18, 2019

(87) PCT Pub. No.: WO2018/148632
PCT Pub. Date: Aug. 16, 2018

(65) Prior Publication Data
US 2019/0381726 A1 Dec. 19, 2019

Related U.S. Application Data

(60) Provisional application No. 62/458,157, filed on Feb. 13, 2017.

(51) Int. Cl.
*B29C 64/124* (2017.01)
*B29C 70/74* (2006.01)
(Continued)

(52) U.S. Cl.
CPC .......... *B29C 64/124* (2017.08); *B29C 64/129* (2017.08); *B29C 64/135* (2017.08);
(Continued)

(58) Field of Classification Search
CPC ... B29C 64/124; B29C 64/129; B29C 64/135; B29C 70/745
See application file for complete search history.

(56) References Cited

U.S. PATENT DOCUMENTS

| | | | |
|---|---|---|---|
| 5,143,663 | A | 9/1992 | Leyden et al. |
| 5,171,490 | A | 12/1992 | Fudim |

(Continued)

FOREIGN PATENT DOCUMENTS

| | | | | |
|---|---|---|---|---|
| WO | WO-2015200173 A1 | * | 12/2015 | .......... B29C 64/135 |
| WO | 2016/140886 | | 9/2016 | |
| WO | 2017/112682 | | 6/2017 | |

OTHER PUBLICATIONS

International Search Report and Written Opinion for PCT/US2018/017772 dated May 30, 2018, 14 pages.
(Continued)

*Primary Examiner* — Atul P. Khare
(74) *Attorney, Agent, or Firm* — Myers Bigel, P.A.

(57) ABSTRACT

A method of making a composite article comprised of a first component (10) and a second component (30) includes (a) providing a first component (10) and an optically transparent member (22) having a build surface with the first component having a first three-dimensional interfacing segment formed thereon; (b) immersing the first three-dimensional interfacing segment in polymerizable liquid (21); (c) forming an intermediate object by irradiating a build region with light through an optically transparent member and also advancing the first three-dimensional component and the build surface away from one another to form from the polymerizable liquid (21) a second component (30) on said first three-dimensional interfacing segment, with the second component including a second three-dimensional interfacing segment in contact with the first three-dimensional interfacing segment; then (d) optionally washing the intermediate; and
(Continued)

then (e) further solidifying the second three-dimensional component (30) on said first three-dimensional component (10) to form said composite article.

20 Claims, 4 Drawing Sheets

(51) Int. Cl.
  *B29C 64/129* (2017.01)
  *B29C 64/135* (2017.01)
  *B29C 70/68* (2006.01)
  *B29C 64/264* (2017.01)
  *B33Y 10/00* (2015.01)

(52) U.S. Cl.
  CPC .......... *B29C 70/682* (2013.01); *B29C 70/745* (2013.01); *B33Y 10/00* (2014.12)

(56) References Cited

U.S. PATENT DOCUMENTS

| | | | |
|---|---|---|---|
| 5,173,220 A | 12/1992 | Reiff et al. | |
| 6,051,179 A * | 4/2000 | Hagenau | B33Y 10/00 264/401 |
| 10,118,343 B1 * | 11/2018 | Linnell | B29C 64/124 |
| 2009/0309267 A1 * | 12/2009 | Boot | B29C 64/135 264/496 |
| 2010/0283188 A1 * | 11/2010 | Rohner | A61C 13/0013 264/401 |
| 2011/0077760 A1 | 3/2011 | Schmidt et al. | |
| 2012/0328726 A1 * | 12/2012 | Zenere | B29C 64/245 425/174.4 |
| 2016/0067921 A1 | 3/2016 | Willis et al. | |
| 2017/0087769 A1 * | 3/2017 | Lancaster-Larocque | B33Y 30/00 |
| 2017/0217100 A1 * | 8/2017 | Gardiner | B29C 64/135 |

OTHER PUBLICATIONS

Wasley, Thomas et al: "Enabling Rapid Production and Mass Customisation of Electronics Using Digitally Driven Hybrid Additive Manufacturing Techniques," 2016 IEEE 66th Electronic Components and Technology Conference (ECTC), IEEE, May 31, 2016, pp. 849-856.

Li, J. et al., "Hybrid additive manufacturing of 3D electronic systems," Journal of Micromechanics & Microengineering, Institute of Physics Publishing, vol. 26, No. 10, Aug. 23, 2016, 14 pages.

Tehrani, Bijan et al., "The Principles of "Smart" Encapsulation: Using Additive Printing Technology for the Realization of Intelligent Application-Specific Packages for IoT, 5G, and Automotive Radar Applications", 2018 IEEE 68th Electronic Components and Technology Conference (ECTC), IEEE, May 29, 2018, pp. 111-117.

Bahr, Ryan et al., "A Novel Integration of Stereolithography and Inkjet Printing for Multiple Modules with High Frequency Packaging Applications,", 2018 IEEE 68th Electronic Components and Technology Conference (ECTC), IEEE, May 29, 2018, pp. 2948-2504.

* cited by examiner

METHOD OF MAKING COMPOSITE OBJECTS BY ADDITIVE MANUFACTURING

RELATED APPLICATION

This application is a 35 U.S.C. § 371 national phase entry of International Application No. PCT/US2017/017772, filed Feb. 12, 2018 which claims priority to U.S. Provisional Application Ser. No. 62/458,157, filed Feb. 13, 2017, disclosure disclosures of which are incorporated by reference herein in its entirety their entireties.

FIELD OF THE INVENTION

The present invention concerns additive manufacturing generally, and more specifically concerns methods of making composite articles by stereolithography.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Generally referred to as "stereolithography," two particular techniques are known: one in which new layers are formed at the top surface of the growing object; the other in which new layers are formed at the bottom surface of the growing object. Examples of such methods include those given in U.S. Pat. No. 5,236,637 to Hull (see, e.g., FIGS. 3-4), U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al.

More recently, techniques referred to as "continuous liquid interface production" (or "CLIP") have been developed. These techniques enable the rapid production of three-dimensional objects in a layerless manner, by which the parts may have desirable structural and mechanical properties. See, e.g., J. DeSimone et al., PCT Applications Nos. PCT/US2014/015486 (published as U.S. Pat. No. 9,211,678); PCT/US2014/015506 (published as U.S. Pat. No. 9,205,601), PCT/US2014/015497 (published as U.S. Pat. No. 9,216,546), J. Tumbleston, et al., *Continuous liquid interface production of 3D Objects, Science* 347, 1349-1352 (published online 16 Mar. 2015), and R. Janusziewcz et al., Layerless fabrication with continuous liquid interface production, *Proc. Natl. Acad. Sci. USA* 113, 11703-11708 (Oct. 18, 2016).

Dual cure stereolithography resins suitable for stereolithography techniques (particularly for CLIP) are described in J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/016077), and PCT/US2015/036946 (see also U.S. Pat. No. 9,453,142). These resins usually include a first polymerizable system typically polymerized by light (sometimes referred to as "Part A") from which an intermediate object is produced, and also include at least a second polymerizable system ("Part B") which is usually cured after the intermediate object is first formed, and which impart desirable structural and/or tensile properties to the final object. While making possible a still greater variety of structural and mechanical properties for objects produced by these methods, there remains a need for additional techniques, particularly where the production of composite articles (e.g., articles comprised of a polymeric component and a non-polymeric component) is desired.

SUMMARY

A method of making a composite article by additive manufacturing, the composite article including a first component and a second component. The method includes the steps of:

(a) providing a first component and an optically transparent member having a build surface, the first component and the build surface defining a build region therebetween, with the build surface having a polymerizable liquid thereon, and with the first component having a first three-dimensional interfacing segment formed thereon;

(b) immersing the first three-dimensional interfacing segment in the polymerizable liquid;

(c) forming an intermediate object by irradiating the build region with light through the optically transparent member and also advancing the first three-dimensional component and the build surface away from one another to form from the polymerizable liquid a second component on the first three-dimensional interfacing segment, with the second component including a second three-dimensional interfacing segment in contact with the first three-dimensional interfacing segment; then (d) optionally, but in some embodiments preferably washing the intermediate object (e.g., with a wash liquid comprising an organic solvent); and then (e) further solidifying the second three-dimensional component on the first three-dimensional component (e.g., by heating) to form the composite article, with the first three-dimensional interfacing segment and the second three-dimensional interfacing segment in contact with one another.

In some embodiments, the first three-dimensional interfacing segment is configured so that retained polymerizable liquid remains in or on the intermediate object after completion of the forming step (c). In some embodiments, the retained polymerizable liquid is either (i) fully enclosed by the first component and by polymerized portions of the second component (e.g., is inaccessible to wash liquid), or (ii) is in a blind-end or dead-end region defined by the first component and by polymerized portions of the second component (e.g., in a region through which wash liquid cannot unidirectionally flow.

In some embodiments, the further solidifying step is carried out under conditions in which the first and second three-dimensional interfacing segments adhere to one another.

In some embodiments, the first three-dimensional interfacing segment comprises a first interlocking segment, the second three-dimensional interfacing segment comprises a second interlocking segment, and the further solidifying step is carried out under conditions in which the first and second interlocking segments interlock with one another.

In some embodiments, the first three-dimensional interfacing segment comprises an outward-facing overhanging segment, an inward-facing overhanging segment, a bridging segment, or a combination thereof.

In some embodiments, the second three-dimensional interfacing segment comprises an enlarged internal or external head connected to a corresponding internal or external stem.

In some embodiments, the first-three-dimensional interfacing segment is comprised of a metal, a metal alloy, a ceramic, glass, carbon fiber, or a composite thereof.

In some embodiments, the optically transparent window is substantially fixed and stationary in the lateral (x and y) directions.

In some embodiments, the forming step (c) is carried out by bottom-up stereolithography.

In some embodiments, the forming step (c) is carried out by continuous liquid interface production.

In some embodiments, the polymerizable liquid is comprised of: (a) light-polymerizable monomers and/or prepolymers that can participate in forming an intermediate object by stereolithography (preferably included in an amount of from 5, 10, or 20 percent by weight, to 50, 60, or 80 percent by weight); and (b) heat-polymerizable monomers and/or prepolymers (preferably included in an amount of from 5, 10 or 20 percent by weight, to 40, 50 or 60 percent by weight). In some embodiments, the polymerizable liquid comprises a light-polymerizable component that degrades after light polymerization in step (c) and forms a constituent necessary for the further solidifying step (e).

A. Ermoshkin et al., *Method of Additive Manufacturing by Fabrication through Multiple Zones*, US Patent Application Publication No. 2016030793 (Oct. 26, 2016) describes at paragraph 104 continuous liquid interface production onto an existing metal part having "lock and key" features, but does not describe the use of dual cure polymerizable liquids to further secure such features.

The foregoing and other objects and aspects of the present invention are explained in greater detail in the drawings herein and the specification set forth below. The disclosures of all United States patent references cited herein are to be incorporated herein by reference.

DETAILED DESCRIPTION

Figure 1:
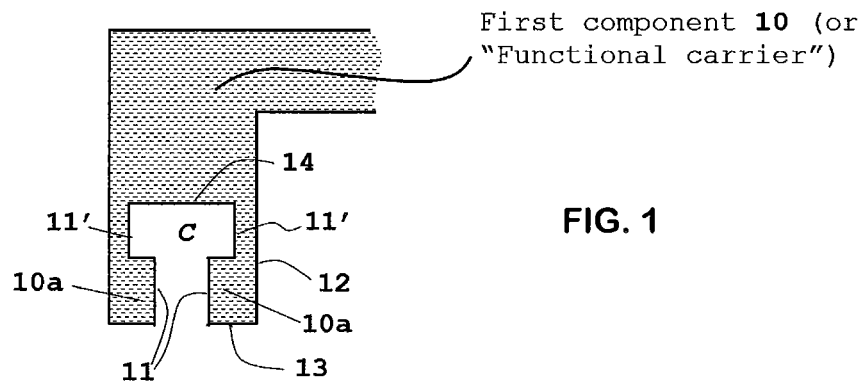
FIG. 1 is a side-sectional, schematic, view of a first component for use in making a composite article of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

1. Dual Cure Resins.

Dual cure polymerizable liquids useful in additive manufacturing, particularly for stereolithogrpahy techniques such as continuous liquid interface production (CLIP) are known and described in, for example, J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/016077), and PCT/US2015/036946 (see also U.S. Pat. No. 9,453,142). In general, such resins can comprise: (a) light-polymerizable monomers and/or prepolymers that can form an intermediate object (typically in the presence of a photocatalyst); and (b) heat-polymerizable monomers and/or prepolymers. As noted above, in some embodiments, these constituents may be supplemented, and/or replaced with, (c) thermoplastic particles and/or (d) Diels-Alder adducts. Each of these constituents is discussed further below.

A. Light-Polymerizable Monomers and/or Prepolymers.

Sometimes also referred to as "Part A" of the resin, these are monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification during photolithography. In some embodiments, this amount corresponds to less than ten, twenty, or thirty percent by weight of the total resin (polymerizable liquid) composition.

Examples of suitable reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step, as discussed further below.

B. Heat-Polymerizable Monomers and/or Prepolymers.

Sometimes also referred to as "Part B", these constituents may comprise, consist of or consist essentially of a mix of monomers and/or prepolymers that possess reactive end groups that participate in a second solidification reaction after the Part A solidification reaction. In general, for dual cure resins, examples of methods used to solidify Part B include, but are not limited to, contacting the object or scaffold to heat, water or water vapor, light at a different wavelength than that at which Part A is cured, catalysts, (with or without additional heat), evaporation of a solvent from the polymerizable liquid (e.g., using heat, vacuum, or a combination thereof), microwave irradiation, etc., including combinations thereof. In this case, heat curing of the "Part B" resins is preferred.

Examples of suitable reactive end group pairs suitable for Part B constituents, monomers or prepolymers include, but are not limited to: epoxy/amine, epoxy/hydroxyl, oxetane/amine, oxetane/alcohol, isocyanate*/hydroxyl, Isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, aminoplast, alkyne/Azide (also known as one embodiment of "Click Chemistry," along with additional reactions including thiolene, Michael additions, Diels-Alder reactions, nucleophilic substitution reactions, etc.), alkene/Sulfur (polybutadiene vulcanization), alkene/peroxide, alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), Perfluorovinyl (coupling to form perfluorocyclobutane), etc., where *Isocyanates include protected isocyanates (e.g. oximes)), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, Siloxanes, epoxides, cyclic ethers, imines, cyclic acetals, etc.), etc. As will be noted from the above, the "Part B" components generally comprise at least a pair of compounds, reactive with one another (e.g., a polyisocyanate, and a polyamine).

C. Thermoplastic Particles.

Thermoplastic polymer particles as used herein are those that are not initially soluble in the polymerizable liquid, but can be dispersed in the liquid below the dissolution temperature thereof. "Insoluble" as used herein refers to both completely insoluble polymer particles, and poorly soluble particles which dissolve so slowly that they can be dispersed in the resin without dissolving to such an extent that they cannot be light polymerized as particles in the resin during production of a three dimensional intermediate. Thus, the particles may be initially dispersed rather than dissolved for any reason, including but not limited to inherently immiscibility/insolubility, Upper Critical Solution Temperature (UCST), crystallization, encapsulation in a shell which melts/degrades at high temperatures (e.g., wax melt, crystal melt, hydrogen bonding, degradation at high temperature, etc.).

Optionally, but in some embodiments preferably, the thermoplastic polymer from which the particles are formed may include terminal function or reactive groups. Suitable functional or reactive groups include, but are not limited to, amine, phenol, maleimide, and carboxyl groups. Such reactive groups may be included for any of a variety of purposes, including but not limited to promoting compatibility and adhesion between matrices, such as: the first and second curable components of the dual cure system, and the thermoplastics, may react with thermosettable component or UV curable component to form stable linkages, may react with thermosettable components or UV curable component transiently, to control domain size and morphology of phase-separated thermoplastic, may catalyze cure of thermosettable components, acting as a latent catalyst (especially amine-terminated with epoxy and cyanate ester), etc.

In general, the thermoplastic particles have an average diameter of from 0.5 to 10, 20, or 50 microns. They may be prepared from a thermoplastic polymer by any suitable technique, including but not limited to mechanical grinding, cryo milling, spray drying, coagulation, etc., along with sieving or other techniques known to those skilled in the art.

D. Additional Resin Ingredients.

Photoinitiators included in the polymerizable liquid (resin) can be any suitable photoiniator, including type I and type II photoinitiators and including commonly used UV photoinitiators, examples of which include but are not limited to such as acetophenones (diethoxyacetophenone for example), phosphine oxides diphenyl(2,4,6-trimethylbenzoyl)phosphine oxide, phenylbis(2,4,6-trimethylbenzoyl) phosphine oxide (PPO), Irgacure 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 um average diameter).

The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Hardeners:

Additional components (hardeners) can be used which react with the liberated maleimide. Any suitable hardener may be used (see, e.g., U.S. Pat. Nos. 5,599,856; 6,656,979; 8,632,654; and 9,3115,698). In some embodiments, the hardener comprises an amine or polyamine (e.g., an aromatic amine or polyamine, a cycloaliphatic amine or polyamine, an aliphatic amine or polyamine such as a polyether amine, etc.).

In some embodiments, the hardener comprises a thiol or polythiol, an allyl or polyallyl (diallyls, triallyls); a maleimide (including but not limited to those described herein above and below); a vinyl ether, etc.

Particular examples of suitable thiol hardeners include, but are not limited to, 4,4'-dimercaptodiphenylether, 4,4'-dimercaptobiphenyl, trimethylolpropane tris(3-mercaptopropionate), pentaerythritol tetrakis(3-mercaptopropionate), 1,3,5-tris(3-mercaptopropyl)-1,3,5-triazine-2,4,6-trione, etc.

Examples of suitable allyls include, but are not limited to, allyl (meth)acrylate, 2,2'-diallylbisphenol A and triallyl-1,3,5-triazine-2,4,6-(1H,3H,5H)-trione.

In some embodiments, the hardener comprises a latent hardener (including mixtures thereof): That is, a hardener having a low reactivity at lower temperatures, and/or which is sparingly soluble at lower temperatures, such that the hardener can be more stable at room temperature, but then activated upon heating. Numerous examples of latent hardeners are known (See, e.g., U.S. Pat. No. 8,779,036; see also U.S. Pat. No. 4,859,761). Particular examples include substituted guanidines and aromatic amines, such as dicyandiamide, benzoguanamine, o-tolylbiguanidine, bis(4-aminophenyl) sulfone (also known as diamino diphenylsulfone: DDS), bis(3-aminophenyl) sulfone, 4,4'-methylenediamine, 1,2- or 1,3- or 1,4-benzenediamines, bis(4-aminophenyl)-1,4-diisopropylbenzene (e.g. EPON 1061 from Shell), bis(4-amino-3,5-dimethylphenyl)-1,4-diisopropylbenzene (e.g. EPON 1062 from Shell), bis(aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenylcyclohexane, methylenebis (2,6-diethylaniline) (e.g. LONZACURE M-DEA from Lonza), methylenebis(2-isopropyl-6-methylaniline) (e.g. LONZACURE M-MIPA from Lonza), methylenebis(2,6-diisopropylaniline) (e.g. LONZACURE M-DIPA from Lonza), 4-aminodiphenylamine, diethyltoluenediamine, phenyl-4,6-diaminotriazine, and lauryl-4,6-diaminotriazine. Still other examples include N-acylimidazoles such as 1-(2',4',6'-trimethylbenzoyl)-2-phenylimidazole or 1-benzoyl-2-isopropylimidazole (see, e.g., U.S. Pat. Nos. 4,436,892 and 4,587,311); Cyanoacetyl compounds such as neopentyl glycol biscyanoacetate, N-isobutylcyanoacetamide, 1,6-hexamethylene biscyanoacetate or 1,4-cyclohexanedimethanol biscyanoacetate (see, e.g., U.S. Pat. No. 4,283,520); N-cyanoacylamide compounds such as N,N'-dicyanoadipic diamide (see, e.g., U.S. Pat. Nos. 4,529,821, 4,550,203, and 4,618,712); acylthiopropylphenols (see, e.g., U.S. Pat. No. 4,694,096) and the urea derivatives such as toluene-2,4-bis (N,N-dimethylcarbamide) (see, e.g., U.S. Pat. No. 3,386,955); and aliphatic or cycloaliphatic diamines and polyamines if they are sufficiently unreactive. An example which may be mentioned here is polyetheramines, e.g. JEFFAMINE 230 and 400. Aliphatic or cycloaliphatic diamines or polyamines whose reactivity has been reduced by steric and/or electronic influencing factors or/and are sparingly soluble or have a high melting point, e.g. JEFFLINK 754 (Huntsman) or CLEARLINK 1000 (Dorf Ketal) can also be used.

Dyes/Non-Reactive Light Absorbers.

In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenyl-benzotriazole, oxanilide, benzophenone, thioxanthone, hydroxypenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695, 643, the disclosures of which are incorporated herein by reference.

Fillers.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 20150215430. The toughener may be uniformly distributed in the form of particles in the cured product. The particles could be less than 5 microns (um) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-Shell Rubbers.

Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kanaka Kance Ace MX 120, Kaneka Kane Ace MX 153, Kaneka Kane Ace MX 154, Kaneka Kane Ace MX 156, Kaneka Kane Ace MX170, and Kaneka Kane Ace MX 257 and Kaneka Kane Ace MX 120 core-shell rubber dispersions, and mixtures thereof.

2. Apparatus and General Methods.

The second component of the composite object is preferably formed from polymerizable resins by additive manufacturing, typically bottom-up additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. Such techniques typically involve projecting light through a window above which a pool of resin (or polymerizable liquid) is carried. A general purpose carrier is typically positioned above the window and above the pool, on which the growing object is produced. In the present invention, the first component functions as the carrier and is at least partially immersed into the pool of resin as described above and below.

In some embodiments of the present invention, the composite object is formed by continuous liquid interface production (CLIP). CLIP is known and described in, for example, PCT Applications Nos. PCMS2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form.

In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the composite object is formed, it is optionally washed (e.g., with an organic solvent), optionally dried (e.g., air dried) and/or rinsed (in any sequence). In preferred embodiments it is then further cured, preferably by heating.

Solvents (or "wash liquids") that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009). Additional examples include hydrofluorocarbon solvents (e.g., 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.); hydrochlorofluorocarbon solvents (e.g., 3,3-Dichloro-1,1,1,2,2-pentafluoropropane, 1,3-Dichloro-1,1,2,2,3-pentafluoropropane, 1,1-Dichloro-1-fluoroethane, etc.); hydrofluorether solvents (e.g., methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc.); volatile methylsiloxane solvents (e.g., hexamethyldisiloxane (OS-10, Dow Corning), octamethyltrisiloxane (OS-20, Dow Corning), decamethyltetrasiloxane (OS-30, Dow Corning), etc.), including mixtures thereof.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

The present invention is explained in greater detail in the following non-limiting Examples.

3. Production of Composite Objects with First Components as Functional Carriers.

Figure 2:
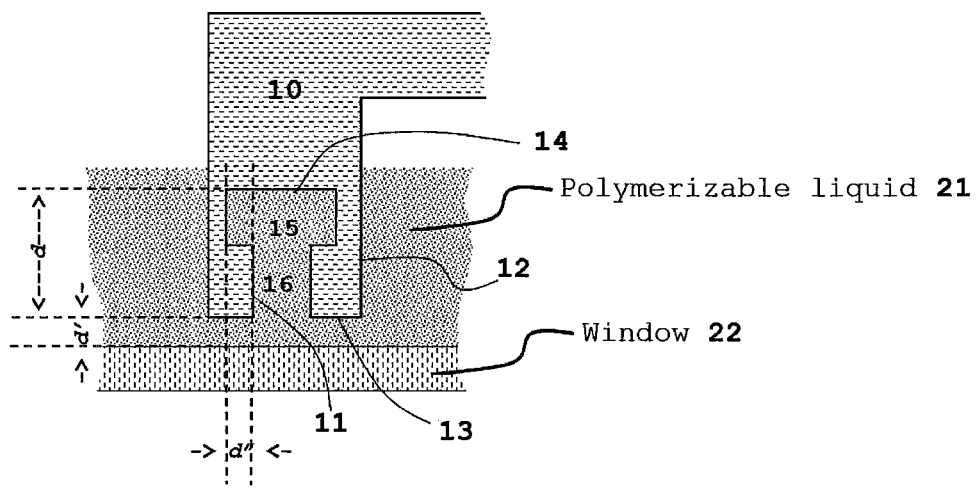
FIG. 2 is a side-sectional view of the component of FIG. 1, partially immersed in a pool of polymerizable liquid.

FIG. 1 is a side-sectional view of a portion of first three-dimensional component (or "part") to serve as a functional carrier 10, on which a polymeric three-dimensional object will be produced as a second component thereof to form a composite object. FIG. 2 is a side-section view of the functional carrier of FIG. 1, partially immersed in a polymerizable liquid (or resin) 21 above an optically transparent window 22, in preparation for continuous liquid interface production (CLIP). Note that the polymerizable liquid contacts vertical surface portions as well as horizontal surface portions. Both internal vertical surface portions 11, 11' (of an internal cavity, C) and external vertical surface portions 12 are contacted by the polymerizable liquid. In addition, both internal horizontal surface portions 13 and external horizontal surface portions 14 are contacted, including horizontal surface portions located at different distances (d, d') from the window.

In FIGS. 1-2, vertical surface portions 11, 11', and 12 are examples of angled surface portions, specifically surface portions at a ninety degree angle to the optically transparent window. Angled surface portions may be straight, but angled surface portions include convex and concave surface portions, such as convex and concave surface portions (where the angle changes through the curved region), and composites thereof (on both internal and external surfaces of the first component or function carrier 10.

In FIGS. 1-2, horizontal surface portions 13, 14, are aligned with the horizontal window 22, but they are offset from one another as illustrated by distance d' in FIG. 2. Additional horizontal surface portions offset by further distances, or intermediate distances, or combinations thereof, may also be included.

In FIGS. 1-2, the interior cavity 10a defined by surface portions 11, 11', are offset from one another by distance d", with the result that, upon immersion of the first component 10 part or functional carrier, an enlarged liquid head 15 is formed, which is connected by a liquid stem 16 to the remainder of polymerizable liquid beneath and around the first component. Filling need not be complete as shown in FIG. 2 and partial gaps may be formed. In addition, vent holes or additional orifices or channels may be included in the first component 10 to facilitate flow of the polymerizable liquid therein, as discussed further below.

Figure 3:
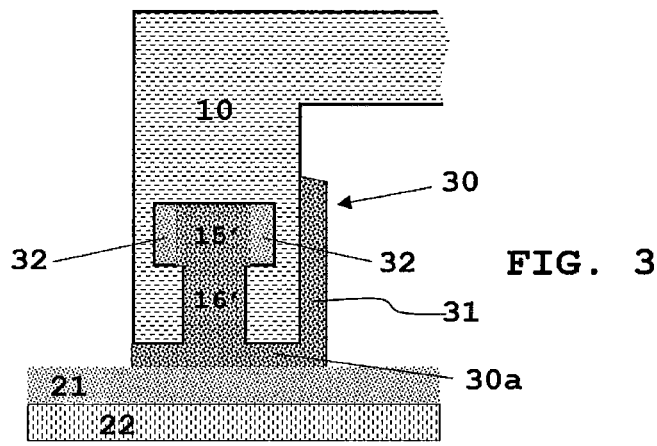
FIG. 3 is a side-sectional view of the component of FIGS. 1-2, after initial exposure of the polymerizable liquid to light, and after initial advancing of the object away from the window. Note that the polymerizable liquid has cured onto the first component at several different depths during the first exposure.

As shown in FIG. 3, after first exposure (or initial exposures) of the polymerizable liquid to light through the window to polymerize the liquid, the second component 30 is partially formed. The second component 30 includes a bottom segment 30a, formed in contact with the lower horizontal surface portion 13 of the first component or functional carrier. The second component further includes an upwardly extending segment 31 which extends above a lower or bottom segment 31' at an angle thereto (ninety degrees as illustrated, but at any suitable angle, compound angle, arc, or combination thereof), which lower segment is formed in contact with the bottom portion 12 of the. In addition a solid interior enlarged head 15' is partially formed, connected to a solidified interior stem 16'. However, portions of the liquid head remain unsolidified 32 as they are blocked from exposure to the light by the distance d" noted above.

Figure 4:
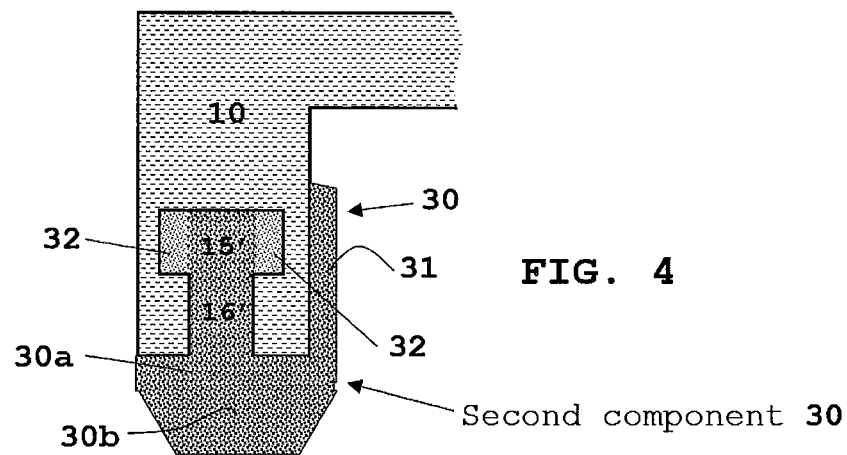
FIG. 4 is a side-sectional view of the component of FIGS. 1-3, now a complete intermediate for the composite article, after completion of exposures to light and after removal from the pool of polymerizable liquid, but before subsequent hardening or curing step.

FIG. 4 shows the second component 30 fully formed on first component 10 after one or more additional exposures to light, to form the extended segment 30b of the second component 30 on bottom segment 30a. Note that liquid components 32 remain unsolidified, so that interior head 15' remains only partially formed.

Figure 5:
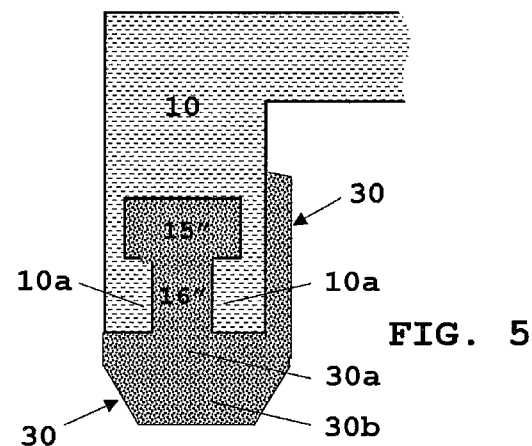
FIG. 5 is a side-sectional view of the composite article of FIG. 4 after a subsequent hardening or curing step.

FIG. 5 shows the composite object, when produced with a dual cure resin as described above, after a subsequent or second curing step (typically heating and/or microwave irradiating). The liquid components 32 (last shown in FIG. 4) are now absent as those regions have been cured, producing a cured interior head 15" connected to the cured interior stem 16", which is in turn connected to the cured bottom segment 30a of the second component. The head 15" and stem 16" together form an interlocking member that interlocks the second component to the first component, as the enlarged head cannot pass through the channel occupied by the stem without significant deformation or rupture thereof. Such an interlocking member may be formed on the exterior of the first component as discussed below, on both the interior and exterior of the first component as discussed below, and may take any suitable geometry, such as a post, pillar, wall, etc. Note that inwardly facing overhanging segments 10a participate or cooperate in the formation of the interlocking segment.

Figure 6:
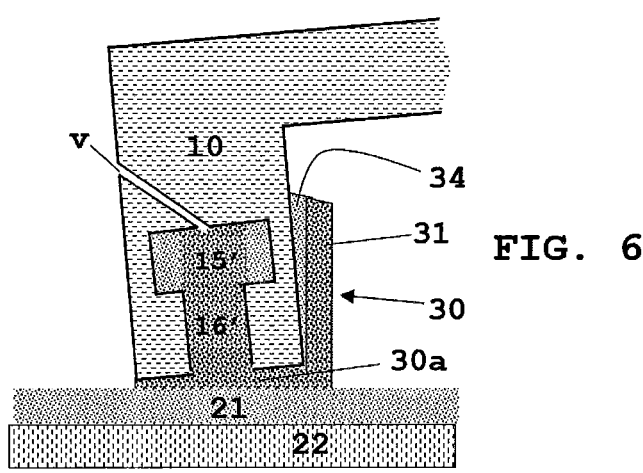
FIG. 6 is similar to FIG. 3 above, but with the first component now oriented at an angle (intentionally or unintentionally) from the window.

FIG. 6 is similar to FIG. 3 as discussed above, except that first component 10 is no longer symmetrically aligned with the window. Such "miss-alignment" may be unintentional, or intentional. Note that an additional unpolymerized region 34 is now formed along with unpolymerized regions 32, but both unpolymerized regions will be solidified and cured in the subsequent curing step (typically heating and/or microwave irradiating). Note also the inclusion of a vent orifice v, which may be included as a single opening or as a series of small perforations. Note that the interior opening of vent orifice is positioned so that polymerizable liquid overlying the orifice is light polymerized, and the unpolymerized regions remain encapsulated by the first component 10, and light polymerized material.

Figure 7:
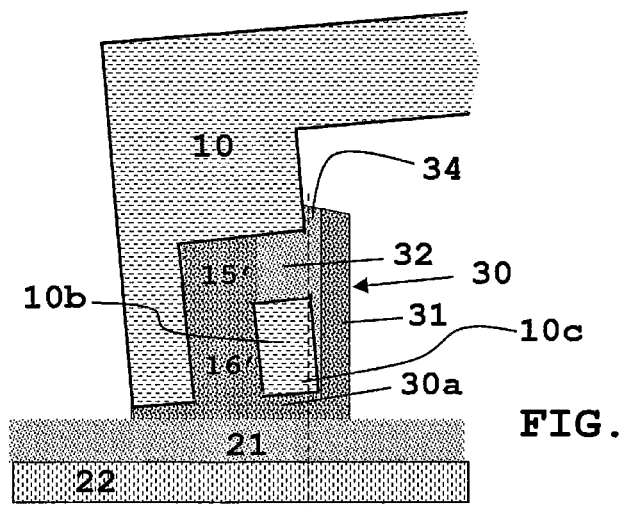
FIG. 7 illustrates an alternate embodiment of a first component, oriented at an angle to the window as in FIG. 6.

FIG. 7 is similar to FIGS. 3 and 6 above, except that an alternate configuration for the head 15' is shown, with an interconnect (occupied by unpolymerized liquid 32, 34) to the side segment 31 now being formed, to generate an alternate embodiment of an interlocking segment (an interior head connected to an upwardly extending segment). Note that the interior bridging segment 10b (fixed or integral with the main body of first component 10 in out-of-plane views) participate or cooperate in the formation of the interlocking segment.

Figure 8:
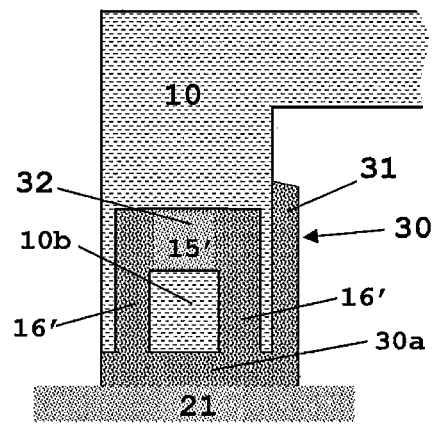
FIG. 8 illustrates a further alternate embodiment of a first component, after initial exposure and advancing as in the embodiment of FIG. 3.

FIG. 8 is similar to FIGS. 3 and 6-7 above, except that an additional alternate configuration for the interlocking segment is shown, now as an interior head 15' connected to a plurality (two or more) of interior stems 16'.

Figure 9:
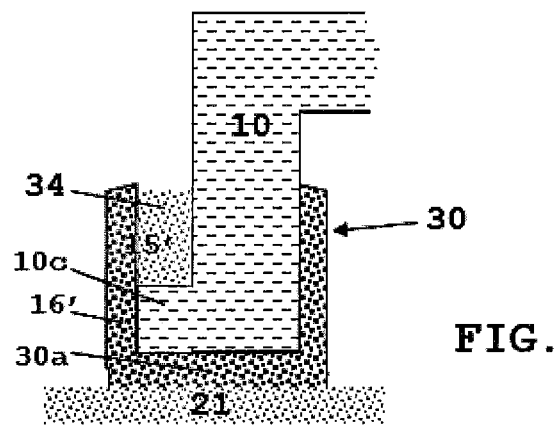
FIG. 9 illustrates a further alternate embodiment of a first component, after initial exposure and advancing as in the embodiment of FIG. 3.

FIG. 9 is similar to FIGS. 3 and 6-8 above, except that an additional alternate configuration for the interlocking segment is shown, now as an exterior head 16' connected to an exterior stem 16. Note that an outwardly facing overhanging segment 10c of the first component 10 is included to participate or cooperate in the formation of the interlocking segment. In contrast, FIGS. 1-6 show inwardly facing overhanging segments 10a, while FIGS. 7-8 show interior bridging segments 10b. Referring back to FIG. 7, note that the slight angle of the object creates a relatively small outwardly facing overhanging segment 10c. Similar results could also be achieved by utilizing a first component having slightly flared side wall portions.

Figure 10:
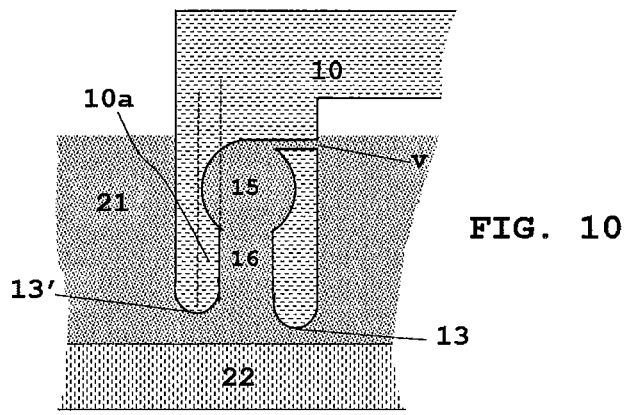
FIG. 10 illustrates a further alternate embodiment of a first component, immersed in the polymerizable liquid as in FIG. 2.

FIG. 10 is similar to FIG. 2 above, except that certain features are shown in a rounded or arcuate configuration, and there are two lower surface portions 13, 13' offset from one another (rather than a single lower surface portion 13 as in FIG. 2). A vent orifice v is also shown, as in FIG. 6, except that, due to the configuration of the objects, this vent orifice is now fully immersed in the polymerizable liquid, and note that the exit or external port thereof may be oriented in a location where resin will not be polymerized through to the exterior thereof. If desired, entry of wash liquid into the area of the head 15 may be inhibited by forming the vent orifice sufficiently small, and/or with a tortuous path, so that significant wash liquid cannot enter therethrough (particularly in light of the plugging effect caused by light polymerization of stem 16, which together with the first component creates a blind-end or dead-end region through which wash liquid cannot unidirectionally flow). Alternatively, the exterior surface of unpolymerized resin in the vent orifice can be polymerized by illumination with ultraviolet light (e.g., spot illumination with a light pen) to further isolate unpolymerized polymerizable liquid from the wash liquid.

Figure 11:
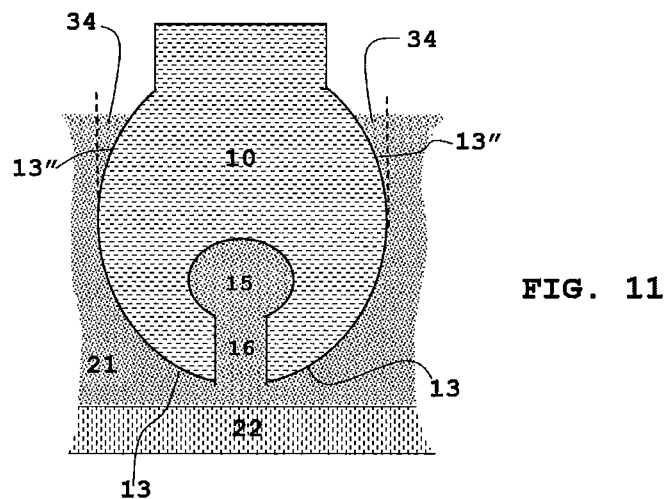
FIG. 11 illustrates a further alternate embodiment of a first component, immersed in the polymerizable liquid as in FIG. 2.
Figure 12:
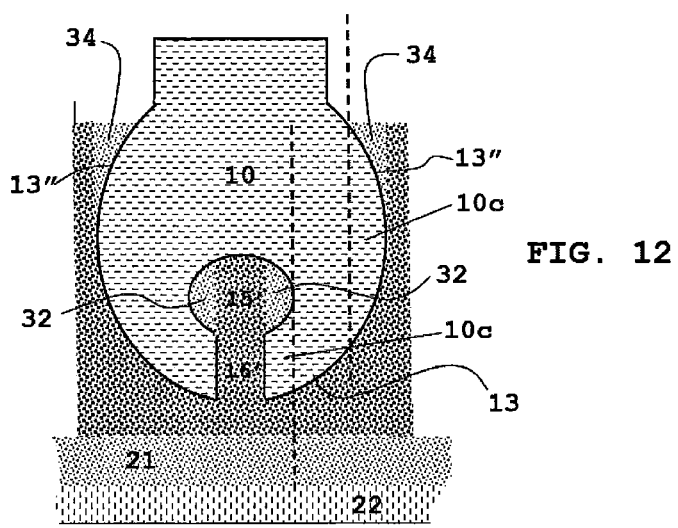
FIG. 12 illustrates the embodiment of FIG. 11, after initial exposure and advancing.

FIGS. 11-12 shows a still further embodiment of the invention, with certain features shown in a rounded configuration, and including both inward facing and outward facing overhanging segments 10a, 10c.

The foregoing is illustrative of the present invention, and is not to be construed as limiting thereof. The invention is defined by the following claims, with equivalents of the claims to be included therein.

We claim:

1. A method of making a composite article by additive manufacturing, the composite article comprised of a first component and a second component, the method comprising the steps of:
   (a) providing said first component and an optically transparent member having a build surface, said first component and said build surface defining a build region therebetween, with said build surface having a polymerizable liquid thereon, and with said first component having a first three-dimensional interfacing segment formed thereon;
   (b) immersing said first three-dimensional interfacing segment in said polymerizable liquid;
   (c) forming an intermediate object by irradiating said build region with light through said optically transparent member and by also advancing said first three-dimensional component and said build surface away from one another to form from said polymerizable liquid an initially solidified second component on said first three-dimensional interfacing segment, with said second component including a second three-dimensional interfacing segment in contact with said first three-dimensional interfacing segment;
   (d) optionally washing said intermediate object with a wash fluid; and
   (e) further solidifying said second three-dimensional component on said first three-dimensional component to form said composite article to comprise said first three-dimensional interfacing segment and said second three-dimensional interfacing segment in contact with one another, wherein said first component comprises a vent orifice to facilitate flow of the polymerizable liquid therein, the vent orifice configured to inhibit entry of said wash fluid to the second interfacing segment.

2. The method of claim 1, wherein said first three-dimensional interfacing segment is configured so that a retained amount of said polymerizable liquid remains in or on said intermediate object after completion of said forming step (c).

3. The method of claim 2, wherein:
said retained polymerizable liquid is either (i) fully enclosed by said first component and by polymerized portions of said second component formed by said forming step (c), or (ii) is in a blind-end or dead-end region defined by said first component and by polymerized portions of said second component formed by said forming step (c).

4. The method of claim 1, wherein said further solidifying step (e) is carried out by heating.

5. The method of claim 1, wherein said further solidifying step (e) is carried out under conditions in which said first and second three-dimensional interfacing segments adhere to one another.

6. The method of claim 1, wherein said first three-dimensional interfacing segment comprises a first interlocking segment, said second three-dimensional interfacing segment comprises a second interlocking segment, and said further solidifying step (e) is carried out under conditions in which said first and second interlocking segments interlock with one another.

7. The method of claim 1, wherein said first three-dimensional interfacing segment comprises an outward-facing overhanging segment, an inward-facing overhanging segment, a bridging segment, or a combination thereof.

8. The method of claim 1, wherein said second three-dimensional interfacing segment comprises an enlarged internal or external head connected to a corresponding internal or external stem.

9. The method of claim 1, wherein said first three-dimensional interfacing segment is comprised of a metal, a metal alloy, a ceramic, glass, carbon fiber, or a composite thereof.

10. The method of claim 1, wherein said optically transparent member is substantially fixed and stationary in lateral directions thereof.

11. The method of claim 1, wherein said forming step (c) is carried out by bottom-up stereolithography.

12. The method of claim 1, wherein said forming step (c) is carried out by continuous liquid interface production.

13. The method of claim 1, wherein said polymerizable liquid is comprised of:
   (a) light-polymerizable monomers and/or prepolymers configured to participate in forming the intermediate object by stereolithography performed by said forming step (c); and
   (b) heat-polymerizable monomers and/or prepolymers configured to participate in said further solidifying step (e).

14. The method of claim 13, wherein said light-polymerizable monomers and/or prepolymers comprise reactive end groups selected from acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

15. The method of claim 13, wherein said heat-polymerizable monomers and/or prepolymers comprise reactive end groups selected from: epoxy/amine, epoxy/hydroxyl, oxetane/amine, oxetane/alcohol, isocyanate/hydroxyl, isocyanate/amine, isocyanate/carboxylic acid, cyanate ester, anhydride/amine, amine/carboxylic acid, amine/ester, hydroxyl/carboxylic acid, hydroxyl/acid chloride, amine/acid chloride, vinyl/Si—H, Si—Cl/hydroxyl, Si—Cl/amine, hydroxyl/aldehyde, amine/aldehyde, hydroxymethyl or alkoxymethyl amide/alcohol, aminoplast, alkyne/azide, alkene/sulfur, alkene/thiol, alkyne/thiol, hydroxyl/halide, isocyanate/water, Si—OH/hydroxyl, Si—OH/water, Si—OH/Si—H, Si—OH/Si—OH, perfluorovinyl, diene/dienophiles, olefin metathesis polymerization groups, olefin polymerization groups for Ziegler-Natta catalysis, ring-opening polymerization groups, and mixtures thereof.

16. The method of claim 13, wherein said light-polymerizable monomers and/or prepolymers are included in an amount of from 5 to 80 percent by weight, and wherein said heat-polymerizable monomers and/or prepolymers are included in an amount of from 5 to 60 percent by weight.

17. The method of claim 1, wherein said polymerizable liquid comprises a light-polymerizable component that degrades after light polymerization performed by said forming step (c) and forms a constituent necessary for said further solidifying step (e).

18. The method of claim 1, wherein said washing step (d) is performed.

19. The method of claim 1, wherein said vent orifice is provided either as a single opening or as a series of small perforations, and wherein said inhibiting is provided by forming the vent orifice sufficiently small and/or with a tortuous path.

20. The method of claim 1, wherein said forming step (c) results in a plugging effect in said vent orifice creating a blind-end or dead-end region through which the wash liquid cannot unidirectionally flow.

* * * * *